United States Patent [19] — Bittermann et al.
[11] 3,768,079
[45] Oct. 23, 1973

[54] METHOD FOR CONNECTION CONTROL IN PROGRAM CONTROLLED PROCESSING SYSTEMS

[75] Inventors: Hans Bittermann, Munich; Albin Hausenblas, Starnberg; Anton Kammerl, Groebenzell, all of Germany

[73] Assignee: Siemens Aktiengesellschaft, Berlin and Munich, Germany

[22] Filed: Feb. 24, 1972

[21] Appl. No.: 229,078

[30] Foreign Application Priority Data

Feb. 26, 1971 Germany .................. P 21 09 318.5

[52] U.S. Cl. .......................... 340/172.5, 179/18 ES
[51] Int. Cl. ............................ G06f 9/16, G06f 3/00
[58] Field of Search ...................... 340/172.5; 444/1; 179/18 ES

[56] References Cited

UNITED STATES PATENTS

| | | | |
|---|---|---|---|
| 3,591,722 | 7/1971 | Palsa | 179/2 |
| 3,660,824 | 5/1972 | Moder et al. | 340/172.5 |
| 3,685,018 | 8/1972 | Brandt et al. | 340/172.5 |
| 3,711,835 | 1/1973 | Jaeger et al. | 340/172.5 |
| 3,717,723 | 2/1973 | Jaskulke et al. | 178/3 |
| 3,454,936 | 7/1969 | Bridge et al. | 340/172.5 |
| 3,517,123 | 6/1970 | Harr et al. | 179/18 ES |
| 3,582,896 | 6/1971 | Silber et al. | 340/172.5 |
| 3,587,060 | 6/1971 | Quinn et al. | 340/172.5 |
| 3,588,842 | 6/1971 | Heldman | 340/172.5 |

*Primary Examiner*—Paul J. Henon
*Assistant Examiner*—Jan E. Rhoads
*Attorney*—Birch, Swindler, McKie and Beckett

[57] ABSTRACT

A method of operation for program controlled, computer operated telecommunication exchange systems is described. Each exchange system has incoming and outgoing lines connected over a line connection unit, and traffics cyclically with a memory unit over a transmission sequence control. The memory contains all data and programs necessary for operating the system. In the memory a storage cell is permanently assigned to each connection. A program control unit is provided for controlling all processing functions. Under the control of a program, signals are entered into feeder cells in the memory, which are assigned permanently to the incoming connection lines. The contents of the feeder cells are read out by the transmission sequence control during the following memory cycle for the feeder cell in question. The signal extracted from the feeder cell are evaluated for handling the next polarity change arriving on the line assigned to this feeder cell. Depending on a first signal, a polarity change arriving on an incoming connection line is entered into a first storage area of the memory, and depending on a second signal, a substitution block in the memory is assigned to the feeder cell. Responsive to a third signal, a polarity change arriving on an incoming connection line is forwarded to an outgoing connection line determined by an address contained in the feeder cell. For transmission of polarity changes through the system at the correct time command words are entered under the control of the program into a second storage area of the memory, and these command words are read out by the transmission sequence control during a search process started in specific time intervals.

9 Claims, 6 Drawing Figures

United States Patent [19] [11] 3,768,079
Bittermann et al. [45] Oct. 23, 1973
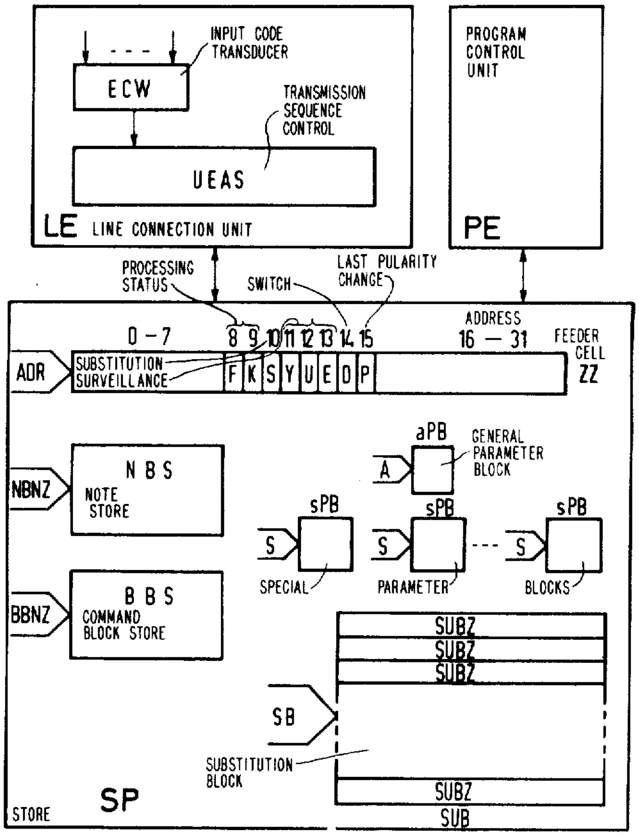

METHOD FOR CONNECTION CONTROL IN PROGRAM CONTROLLED PROCESSING SYSTEMS

BACKGROUND OF THE INVENTION

The invention relates to a method for receiving and transmitting data occuring in the form of polarity changes in a program controlled processing system. In particular, the invention is concerned with a program controlled telecommunication exchange system having incoming and outgoing subscriber lines connected over a line connection unit, having traffic with at least one storage unit cyclically over at least one transmission process control, wherein within an area of the central storage called feeder cell storage, a feeder cell is permanently assigned to each line connected to the line connection unit and wherein the storage unit contains in addition all data and programs necessary for operation, whereby all processing sequences in the system run under the control of at least one program control unit.

In a known processing system of the above mentioned type, the individual processing units operate cyclically with a central store. The processing unit to which the incoming and outgoing lines are connected operates in the same cyclic manner. With regard to this processing unit, denoted in the following as line connection unit, the requesting of a storage cycle occurs in a manner such that when a polarity change arrives on an incoming line, a requirement for a cycle is generated and simultaneously the identification of the line issuing the requirement is executed. On the basis of this identification, an address for that feeder cell is formed being permanently assigned to said incoming line and predetermined data for handling with the received polarity change are stored in said feeder cell. If the incoming polarity change has to be transferred, for example to a specific outgoing line, then the feeder cell contains an address datum, which after transfer to the line connection unit serves there for identification of the desired outgoing connection. Then the information offered over the incoming line is transferred to the outgoing line being identified by this address.

A known processing system of this type is shown in diagrammatic form in the example of an exchange system in FIG. 1. The individual components of this sytem are, as well, of known construction and for that reason are not described in detail herein. Incoming and outgoing lines are connected to line connection unit LE. It contains a system connection unit SAE, an input code transducer ECW and an output code transducer ACW, as well as at least one transmission process control UEAS, over which the line connection unit enters into traffic with the central store SP. Details of the construction and function of a line termination unit and the interoperation thereof with the central storage are described in application Ser. No. 71,675 assigned to the assignee of this invention, filed Sept. 14, 1970, now U.S. Pat. No. 3,717,723, dated Feb. 20, 1973. At least one program control unit PE is present, and it serves to control all functions to be executed by an exchange system. The system functions are program controlled, and all data and programs which are necessary therefor are contained in the central store, to which the program control unit PE also has access, cyclically. Details of the organization of a program control unit suitable for effecting in-cycle communication with the storage, the addressing of storage areas, as well as the takeover of data from the storage and the transfer of data to storage are described in U.S. Pat. No. 3,660,824.

It is known to start the requirements for alloting storage cycles only when a change of the prevailing potential state occurs on a incoming line. Such changes are always designated as polarity changes in the following. Thus, in the example of FIG. 1, if a datum occurring in the form of a polarity change is forwarded to a specific outgoing line, i.e., is transmitted, then, upon receiving the polarity change in the line connection unit, the connection line issuing the requirement is identified in the input code transducer ECW, and at the same time, a cycle requirement is directed over the transmission process control UEAS to the central store SP. On the basis of the address for the specific feeder cell ZZ in the store SP which is permanently assigned to the requiring connection line, which address is determined by the identification operation, this cell is reached. The address of the desired outgoing line was entered into the feeder cell during the dialing process. When the feeder cell is read out, the address arrives in the transmission process control, where it is made available to the output code transducer ACW. The latter identifies the desired outgoing connection line and transfers the datum, i.e., the polarity change, to it.

It has been assumed for the processes described in the preceding that an address datum identifying the desired outgoing subscriber line has already been entered in the feeder cell. It must be remembered that a through-switched connection is under discussion. The transmission of data, i.e., of polarity changes, during this phase of the connection can occur without special assistance of the program control unit. However, during the establishment and disconnecting state of a connection a close cooperation between the transmission process control in the line connection unit and the program control unit is absolutely necessary, since in this phase the arriving polarity changes must be recognized as parts of certain connection control signals and evaluated, and programs must be started, dependent thereupon. In addition, polarity changes must be generated in a program controlled manner and must be transmitted at the correct time over specific outgoing connection lines. As an example, the polarity change arriving on a connection an incoming line, which is quiescent, must be recognized as a connection requirement signal and evaluated. This requires a specific an access of the program control unit immediately upon reception of the latter signal. Likewise, polarity changes arriving later must be recognized and evaluated as parts of dial signals. During the connection establishment state, polarity changes must be generated at certain times as busy state signals and must be sent on continuing connection lines. All these processes are performed under control of a program control unit PE, whereby the data and programs, contained in the central store, necessary for execution of the individual exchange-oriented tasks, are available to the program control. The program control unit PE also always traffics cyclically with the store SP. In this connection, for the program controlled handling of polarity changes arriving over incoming connection lines as well as polarity changes to be sent out over outgoing connection lines, very extreme real time conditions must be maintained, and this places a substantial load on the system.

It is, therefore, an object of this invention to provide a solution to this problem. In particular, an object of the invention is to provide a method for timely handling of data arriving on an incoming connection, for example in the form of polarity changes, and especially to recognize and process these data during the establishment or dissolution of a connection, for example as call or dial signals.

Another object of the invention is to provide a method for transmitting data to be sent out by the system, e.g., over a line connection unit in the form of polarity changes, at the correct time.

SUMMARY OF THE INVENTION

In accordance with the principles of the invention, the foregoing and other objects are achieved in that signals are entered in a program controlled manner into the feeder cells assigned permanently to the incoming connection lines for every sequence occurring in the system, and are read out by the transmission sequence control during the respective following cycle applying to this feeder cell. The signals are evaluated for processing of the next polarity changes arriving on the connection line assigned to this feeder cell. Depending on a first signal, a polarity change arriving on an incoming connection line is entered into a first storage area of the store, and depending on a second signal, a substitution block in the store is assigned to the feeder cell. As a function of a third signal, a polarity change arriving on an incoming connection line is forwarded to an outgoing connection line, as determined by an address contained in the feeder cell. For accurately timing the transmission of polarity changes through the system, command words are entered in a program controlled manner into a second storage area of the store and are read out by the transmission sequence control during a search process started in specific intervals of time.

BRIEF DESCRIPTION OF THE DRAWINGS

The principles of the invention will be more readily understood by reference to a description of a preferred embodiment thereof given hereinbelow in conjunction with the drawings in which.

DETAILED DESCRIPTION OF THE DRAWINGS

Figure 1:
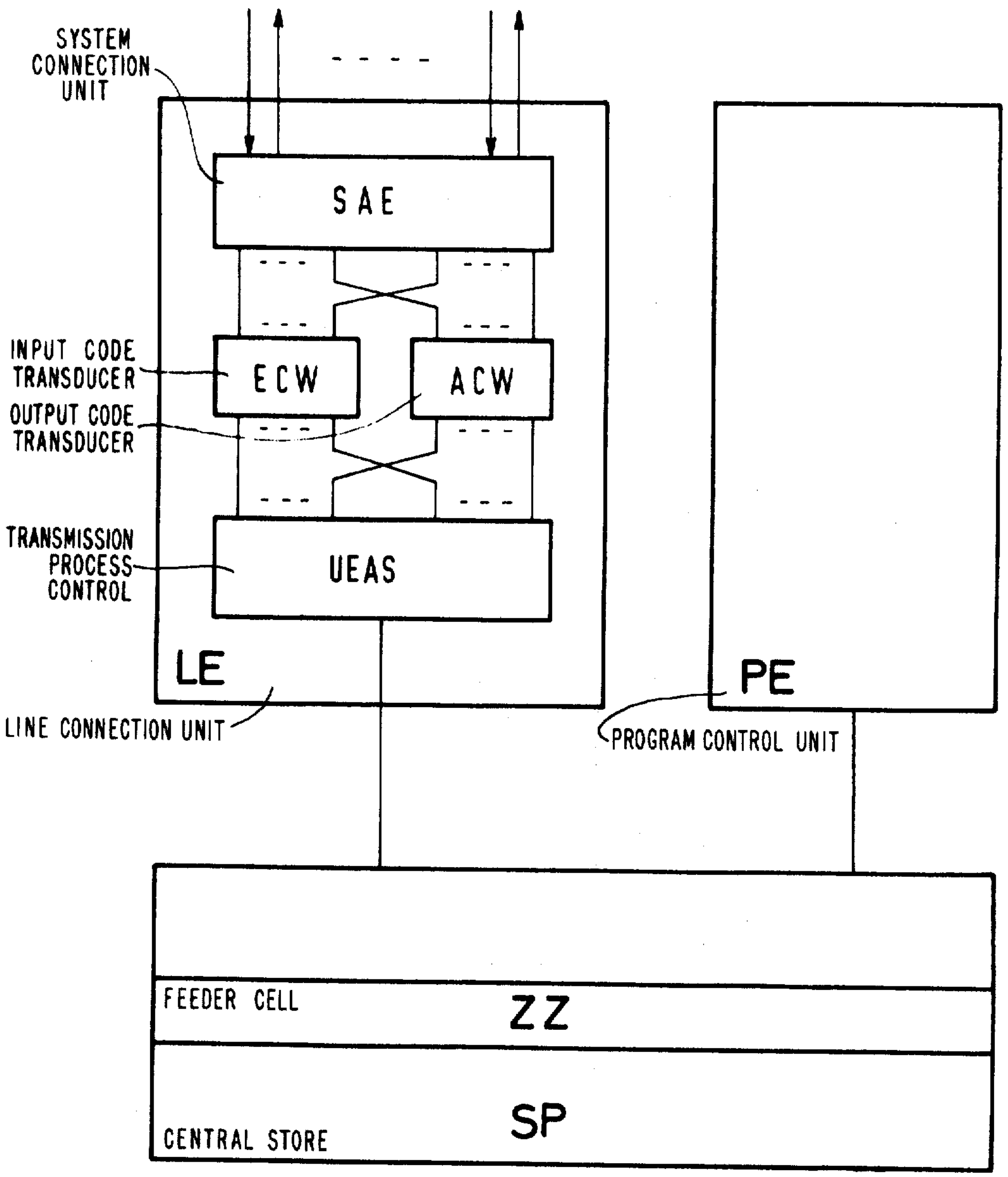
FIG. 1 is a generalized schematic drawing of a preferred form of a prior art system upon which the method of the invention can be used.
Figure 2:
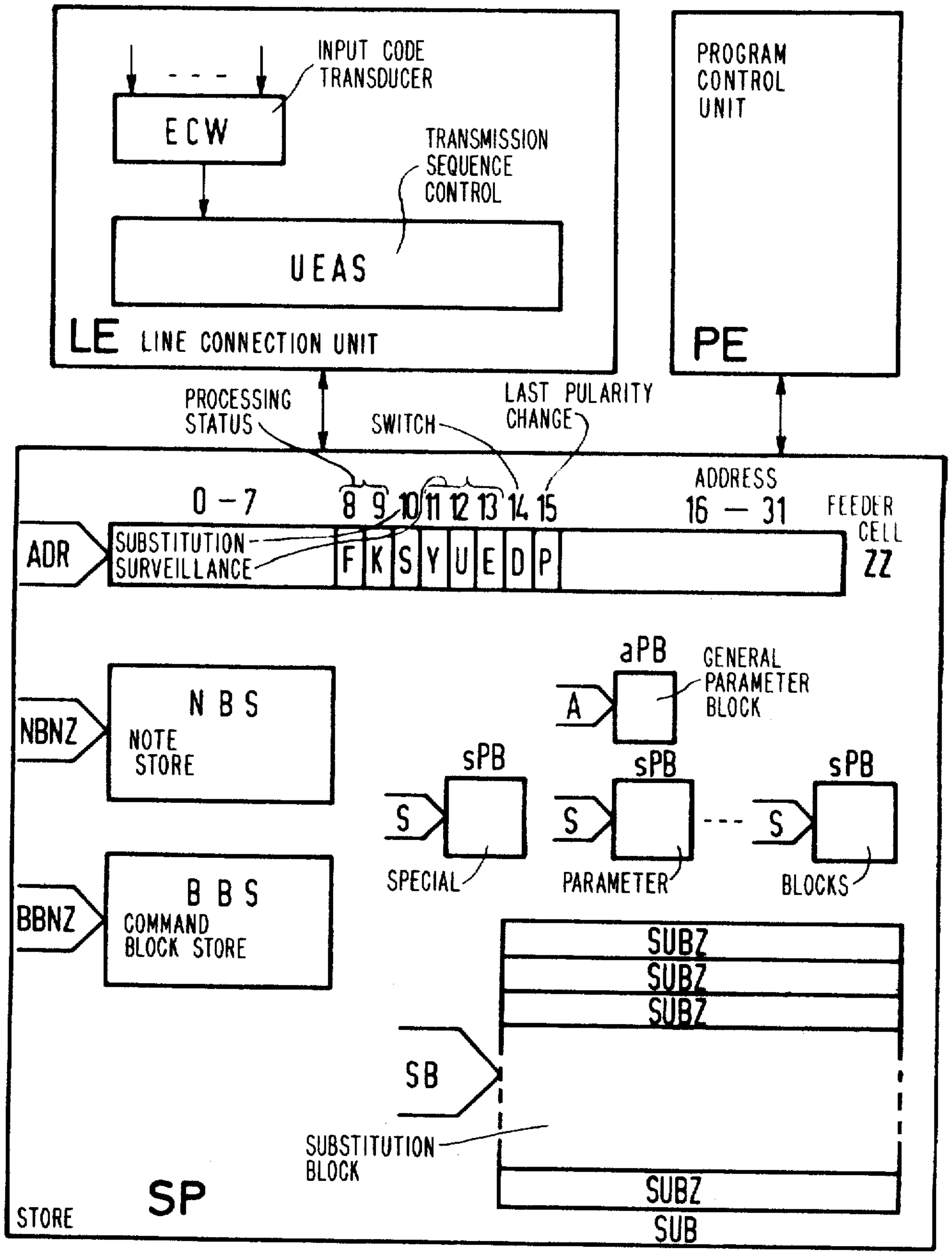
FIG. 2 is a more detailed view of pertinent portions of the FIG. 1 system.

FIG. 2 shows an arrangement of the FIG. 1 system in which only the details necessary for understanding the invention are shown. In the upper part of the figure is a program contorl unit PE and a line connecton unit LE having an input code transducer ECW and transmission sequence control UEAS. Of the storage cells contained in store SP, which are permanently assigned to the incoming connection lines, the so-called feeder cells, only the feeder cell ZZ is shown. Further, the store SP contains a first storage area denoted as note store NBS and a second storage area denoted as command block store BBS. Data are entered into the first storage area, which can be controlled by the transmission sequence control UEAS, together with a declaration about the place of their arrival and an indication of time arrival. These entries are processed by the program in specific intervals of time. Commands are entered into the second storage area, which can be controlled by the program control unit PE, together with an indication of the place of their execution and an indication of the moment of their execution. These entries are queried by the transmission sequence control in specific intervals of time. A general parameter block *a*PB and a series of special parameter blocks *s*PB are present as further units of the store SP. One of the special parameter blocks is alloted to a feeder cell for the duration of a connection, over the general parameter block *a*PB, which can be reached by a number of feeder cells. Finally, a substitution block SUB is present, whose individual cells are denoted with SUBZ.

In the example of FIG. 2, the feeder cell ZZ, which can be controlled over a storage address formed in the line connection unit LE, comprises 32 bit positions. Bits 16 to 31 each contain an address datum. Bit 15 contains the information of the respective last polarity change and is thus denoted by P. Bit 14 is a through switching bit D, which contains a datum about the rest or dial state (D=0) or the through-switched state (D=1) of the connection. Bits 11 to 13 are used for connection surveillance. They are denoted by VUE. Bit 10, denoted by S, represents a substitution bit. Through evaluation of this substitution bit it is possible to reach a substitution block and to assign it to a feeder cell. This opens the possibility of constructing conference and loop connections. Bits 8 and 9, which are denoted by FK, contain data about the processing of the respective following polarity change. By using two bits at this location, it is possible to provide four types of processing for the respective following polarity change. If, for example, both bits are set to 0 (FK=00), then that means that the following polarity change is processed without being entered into the note store NBS for intermediate storing, and is transferred directly to an outgoing connection. If both bits are set to 1 (FK=1), then the following polarity change is entered into the store NBS as a separate entry. Through the combination FK=10 a continuous entry is caused, and through the combination KF=01 a special entry is caused. The last mentioned case is especially advantageous when very long texts are received. In this case, it is advantageous to occupy a further so-called special note store, along with the previously mentioned first storage area, denoted as note store, and to transfer the information to it. The bits 0 to 7, for the case that neither an entry not a substitution is necessary, the bits 0 to 10, serve to describe the connection. They contain information, such as the time of the last computation of fees for the calling subscriber.

From the foregoing one recognizes that the signals contained in bits 8 to 14 of the feeder cell ZZ determine the handling of an incoming polarity change. The fact that the transmission sequence control reads out and again describes the feeder cell assigned to the requiring connection line, within a single core store cycle, means that the old contents of the feeder cell are available to the transmission sequence control. Thereby, also, the signals for handling of the newly arrived polarity change are available.

In the following it shall be assumed that an uncompleted through switched connection is under discussion, and this is designated by the fact that the through-switching bit D is not set (D=0). That is the case, for example, in the rest and in the dial state. In both cases, an arrival of the polarity changes is to be viewed as a part of a connection control signal. In the first case the arriving polarity change is to be handled as a call signal and in the second case as part of the dial information. The coordination of the program control unit is always necessary for handling such polarity changes to cause the running of particular control processes. In these cases, in accordance with the invention, the arrival of a polarity change leads to the result that it is entered into the first storage area, the note store NBS. Thereby, the bits FK in the feeder cell ZZ are set. The entry into the note store can, as already mentioned, occur in the form of a single note or a continuous note. The entry as single note (FK=11) has the advantage that in fact only the first polarity change is entered and that polarity changes which are simulated, for example through contact rebounds, no longer arrive in the note store. In this case, the FK-bits are set anew, by the program, of course after the contact rebounds have died out, but still before the possible arrival of a following polarity change.

The entry of an arriving polarity change into the note store takes place as follows. If with the reading of the contents of the feeder cell ZZ, it is determined on the basis of the identification of an incoming connection line how it happened that the polarity change should be entered into the note store NBS (FK-bits set), then an address for a cell of the note store is formed in the transmission sequence control UEAS from a block starting address N. The state of a binary counter having, e.g., 10 positions, and the polarity change are entered into this cell, whereby the binary state is raised by 1. Thus, the polarity changes to be entered in the note store NBS are entered sequentially in the order of their time of arrival, as event data. Thus, with each entry of an event an indication about the moment of arrival, as well as about the place where the event occurred, the number of an incoming connection line is always entered. When it is recognized through reading out a cell of the note store, that in this cell one is dealing with an end-mark, then the binary counter is set to 0, whereby the first cell in the note store NBS is reset.

With this procedure, it is possible to provide a capability of the note store differing from case to case, in which the end-mark is set at an arbitrary position, for example through an input program. However, it is also possible to provide a note store with fixed capacity. In this case, the end of the note store is recognized by the fact that the binary counter in the transmission sequence control has reached a fixed prescribed value. The individual cells of the note store NBS comprise, just as the feeder cells, 32 bit positions, respectively, into which data about the type of the event to be entered, e.g., a received polarity change, data about the moment of this event and data about the place of the event, e.g., data about the line number, on which a polarity change to be entered arrived, are entered.

Figures 3, 4:
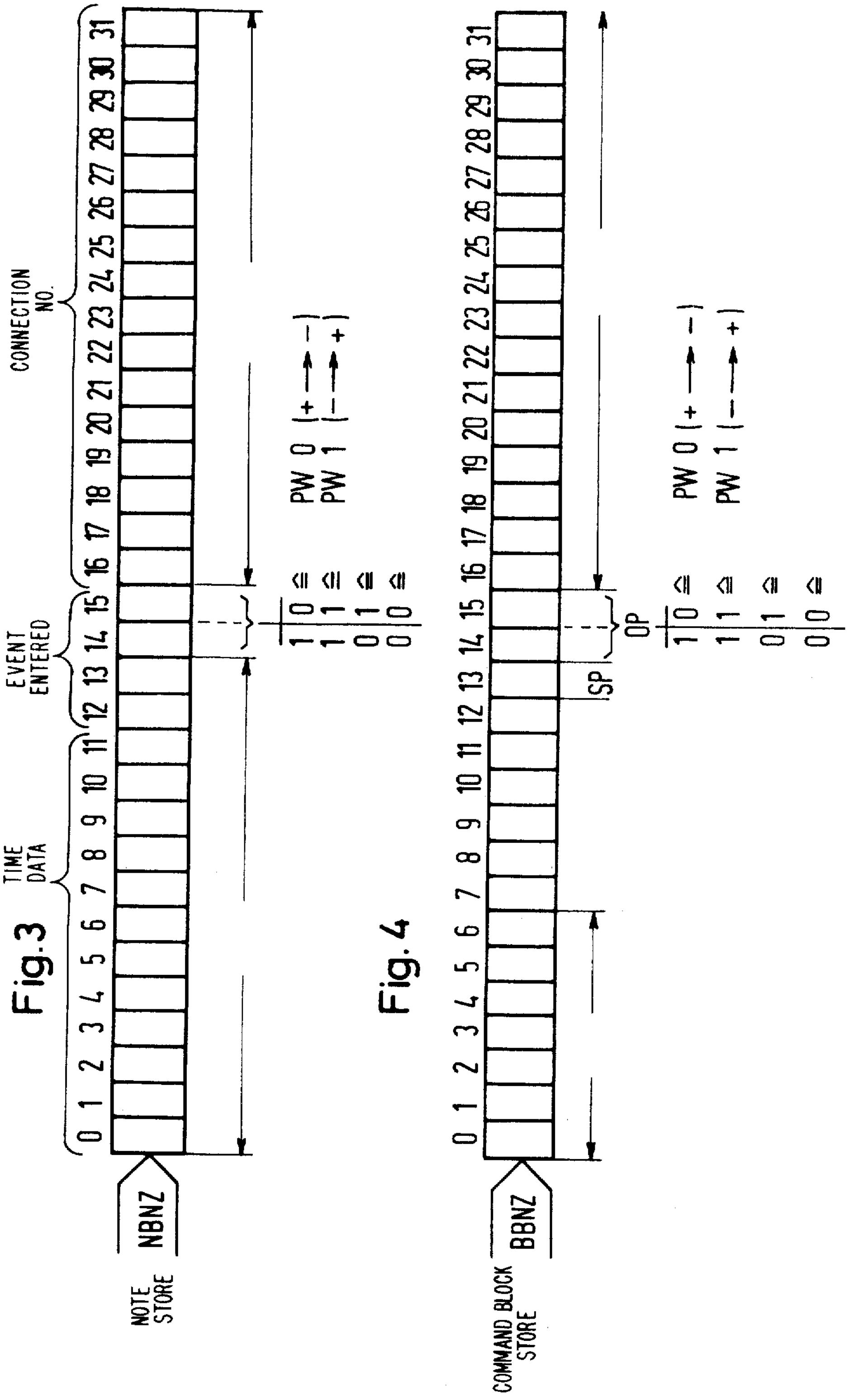
FIG. 3 is a schematic diagram of a note storage cell used in conjunction with the FIG. 2 embodiment.
FIG. 4 is a schematic diagram of a cell of a command block store used in conjunction with the FIG. 2 embodiment.

An example of a note storage cell is shown in FIG. 3. It is reached through the address NBNZ (block starting address + binary counter state). The bit positions 0 to 13 contain the time data, whereas the bit positions 16 to 31 contain the number of the connection on which the event arrived. The bit positions 14 and 15 contain the information about the event to be entered. By using 2 bit positions for this information, it is possible not only to differentiate between an entry for the two possible polarity changes; namely, from start to stop polarity or from stop to start polarity, but also to enter so-called initiating notes. These are commands which are intended for the transmission as well as for the reception direction, thus, are meant for an outgoing or an incoming connection. Details thereon will be given later in the description of the second storage area. As an example for the entry of an event, in FIG. 3 four combination possibilities are indicated, whereas the entry of polarity changes is in double current form. A binary clock present in the transmission sequence control UEAS serves for entering of the time data. Since for the entering of the time indicating signal 14 bit positions are available in the note storage cell, this clock can be a 14-place counter, so that an exact indication of time, which takes into account all requirements, is possible.

The processing of the data which is entered in the note store, occurs such that in certain intervals of time the program control unit PE receives access to the note store. If an entry is found during the processing phase, then a specific program run is started therewith. As soon as the entry has been processed, the contents of this cell are extinguished. The length of the note store is measured in such a manner that it cannot be fully recorded during the intervals of time between the individual processing phases. Thus, no note is superscribed by one following later. However, for the case that the note store is full, e.g., through entries simulated by multiple contact rebounds, it is possible to insert marks in the respective processed part, whereby when they are reached, a special requirement for a premature processing is emitted.

Through the entering of polarity changes as noted with time data into the note store, the advantage is achieved that the running of a program does not have to be started with each arriving polarity change, which otherwise, would bennecessary to maintain the real time conditions. Rather, in using this invention, inquiry processes occur only in specific intervals of time.

The processes described in connection with the note store are closely connected with the reception of polarity changes arriving on incoming connection lines. Also, with transmission of polarity changes it is possible to proceed in a similar manner. For that purpose, a second storage region designated as command block store BBS is present in the store SP. Command words are entered into it by the program control unit PE, which command words cause, for example, the transmission sequence control UEAS to send out polarity changes on a specific outgoing connection line at an exactly defined moment. The command block store also comproses storage cells comprising 32 bit positions each. Therewith, it is possible to enter into a cell with sufficient accuracy a datum about the moment at which a command is to be executed, a datum about the type of command (operational portion), and a datum about the place where the command is supposed to be carried out.

As an example, reference is made in this connection to FIG. 4, in which a cell of the command block store is shown. It is reached through the address BBNZ (command block starting address + binary counter state) by the transmission sequence control UEAS. The time data are in the bits 0 to 6 and the number of the applicable connection is in bits 16 to 31. Bits 14 and 15 contain the information applying to the operation. Through the preparation of two bit positions for these signals, it is possible to differentiate, not only between the commands for transmission of the two polarity changes, but also between two commands for the entry of so-called alerting notices into the note pad store for both the receiving and transmitting directions. Four possible combinations are shown in FIG. 4.

Figure 5:
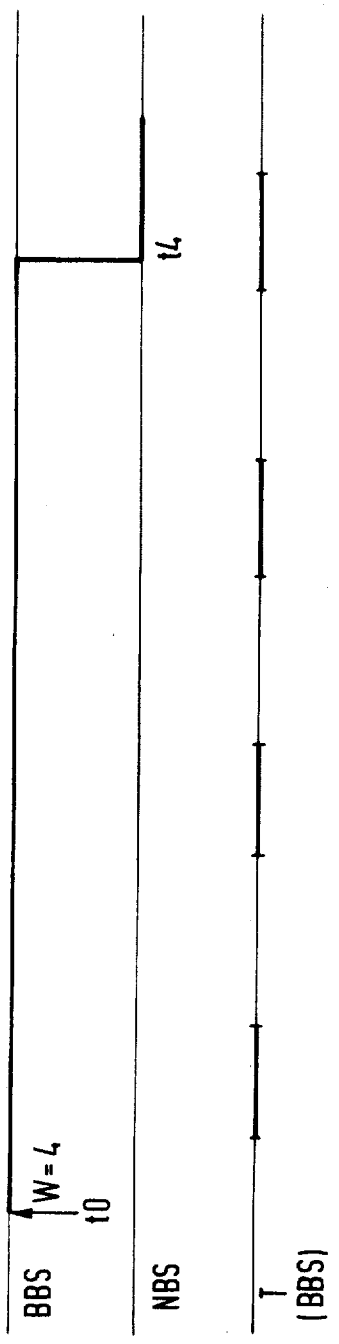
FIG. 5 is a time-waveform diagram illustrating the transfer of an alerting signal from a command block store to a note store in the figurative embodiment.

The transfer of an alerting notice from the command block store into the note store is shown schematically in FIG. 5. Under the assumption that at moment $t0$ a command is entered into a specific storage cell of the command block store BBS, from the time data thereof it can be recognized that it is supposed to be transferred into the note store after four inquiry time units T of the command block store. At moment $t4$, after expiration of the four time-units, the complete contents of the applicable command block storage cell as communicated into a cell of the note store. With its processing through the program, this note leads to the starting of a further program. If it results therefrom that a further activity has taken place (transmission of a polarity change or entry of an alerting notice), then a command word is again recorded in the command block store, and the process is repeated. Since, with the processing of the command block store through the transmission sequence control, the command block store is activated, not only for transmission of polarity changes, but also so that notes can be entered into the note store, it is possible to start programs at the correct time.

It was assumed in the operational description given hereinabove that commands for the transmission sequence control always arrive there over the command block store. However, in addition thereto it is possible to transfer commands directly to the transmission sequence control. Such direct commands for the transmission sequence control are advantageous when polarity changes are supposed to be transmitted and lines are supposed to be polarity-reversed. Since a time datum is superfluous for such a command, the bit positions 0 to 11 in the command block store cell are meaningless. This opens the possibility of using four bit positions, e.g., the bit positions 12 to 15, for the operational portion of such a command. From this results the advantage that 16 different directions can be given to the transmission sequence control. The bit positions 16 to 31 serve, as already indicated, for addressing, i.e., they contain the connection line number, for which the command is intended.

The coordination between the command block and the note block stores becomes particularly evident when one views the transmission of a dial signal. The polarity changes arriving from a calling subscriber over an incoming connection line, entered into the note block store and recognized by the program as parts of the dial information, can be stored intermediately. After their evaluation, under control of the program control unit, the result is obtained that polarity changes are transmitted at the correct time on a specific outgoing connection line. During the transmission of the polarity changes, which are to be considered as parts of the dial information, a cell of the command block store is assigned to the outgoing connection line. The commands for transmission of the next polarity change are entered into this cell by the program. With the processing of the command block store by the transmission sequence control, through time comparison, the moment for the transmission of the polarity change is recognized, the polarity change is emitted on the specific outgoing connection line and the execution of the command is noted in the note block store. With the processing of the note store by the program control unit, on the basis of the time data about the execution of the command, the moment for the transmission of the next polarity change is determined and entered anew into the command block store, whereupon the described process is repeated.

In accordance with the described method, the command block store is searched by the transmission sequence control in specific intervals of time. By this means, it is possible to sense even the shortest intervals between successive polarity changes. The time interval between successive search processes is the time interval T. A further result is obtained in that the interval between two polarity changes must always be a whole-numbered multiple of the time interval T. Since the interval of the polarity changes depends on the speed with which transmission over the line occur, the value of the time interval T is determined through the speeds occurring in the system. In general, it can be said that with increasing transmission speed, the value for the time interval T must be chosen smaller and smaller. Since the command block store, however, must be searched more and more often thereby, and the note block store must be queried more and more frequently, this means a continually increased load on the system, especially when transmissions are made over the lines connected to the system with different speeds.

Figure 6:
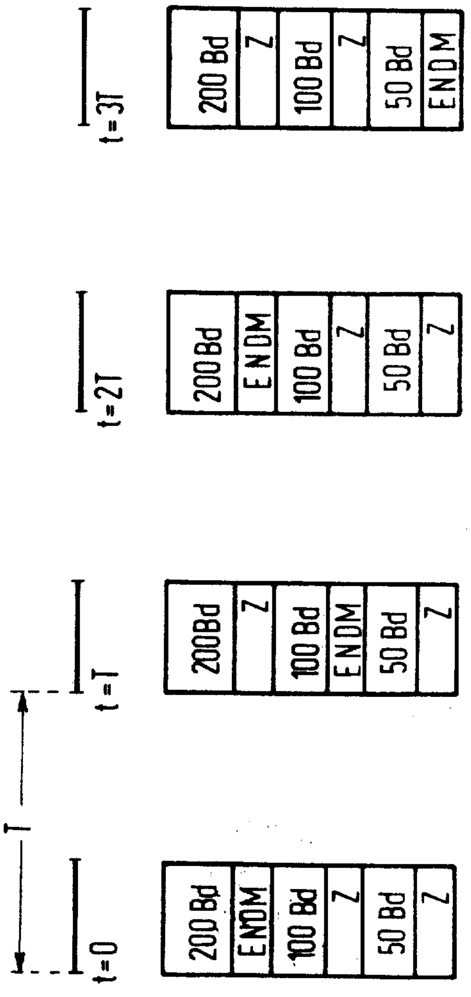
FIG. 6 is a chart illustrating the cell arrangement in the command block store in the figurative embodiment.

In accordance with further features of the invention, the load can be lessened in that the command block store is divided into different sections corresponding to the prescribed speeds, and that each section is separated from the following section by an empty cell. Under the control of the program, this empty cell is described with an end mark after every time interval. In this way, the advantage is achieved that the individual sections of the command block store do not have to be searched more often than absolutely necessary. That is explained in detail in the following example, which is shown in FIG. 6.

Connection lines for 200 Bd, 100 Bd and 50 Bd are connected to the system. If one assumes that conventional dialing as well as push button dialing should be possible, then the values T=2.5 ms, 5ms, 10ms result, corresponding to the speeds for the time interval $T \cdot k$ To search the command block store, therefore, a time interval of 2.5ms is necessary. It is evident that therewith only the polarity changes intended for 200 Bd-lines are normally sensed. In contrast, in the cells of the command block store which are assigned to the 100 Bd-lines, a new command can be contained at the earliest during every second time interval, and in those which are assigned to the 50 Bd-lines, at the earliest during every fourth time interval. Now if the end mark (ENDM) for the search during the first time interval $t0$ is set at the end of the first section in which the 200 Bd cells are included, then the search process is ended when this end mark is reached. For the search during the second time interval $t$=T, the end mark is set at the end of the 100 Bd section and for the search during the third time interval T=2T it is again set at the end of the 200 Bd section. Only for the search during the fourth time interval t=3T is the end mark set at the end of the 50 Bd section, since a new command can be present in these cells for the first time during this time interval.

In accordance with a further improvement, which is especially advantageous, when lines with a plurality of different transmission speeds are connected to the system, it is proposed to set so-called jump bits in certain cells of the command block store, in addition to the end marks. If, during a search process, a cell is reached in which the jump bit is set, then a following section in the command block store is skipped. In this case too the end mark and the jump bit are reset by the program after every time interval T.

Also, for the reception of polarity changes representing parts of the dial information, note block stores, as well as command block stores, cooperate. If, for example, a starting edge, i.e., a polarity change from stop to start polarity, arrives on an incoming line, over which the dial signals are transmitted according to the push-button dialing principles, then an alerting command is entered in the command block store, which, however, becomes effective only during the stop step ending the dial signal, or after the fifth step of a teleprinter signal. This time datum is then a component of an alerting command. In the meantime, the polarity changes of the individual signal steps are entered in the note store and collected by the program. When the alerting command is transferred at the actual moment from the command block store into the transmission sequence control, it is recognized there that a dial signal has ended, and that its identification and storage can take place.

For the case that dial impulses are transmitted by ordinary dialing, then with the starting edge of the first arriving dial impulse, which is entered in the note block store, the program is called forth to enter an alerting command into the command block store. With each starting edge of the following impulse the alerting command is superscribed and set to a new time, whereby the impulses themselves are counted. Only the last alerting command at the end of the impulse series has the effect such that a datum indicating the dial number was received is available to the program.

A signal for entering to a polarity change arriving on the incoming connection line assigned to the feeder cell into the note block store is available for purposes other than providing indications about the specific data in the feeder cell. In addition, further data can also be entered, which lead to the assigning of the substitution block (SUB in FIG. 2) mentioned earlier to the applicable feeder cell. Such an arrangement takes place when the substitution bit S is set in the feeder cell (S=1). In this case, the bits 16 to 31 of the feeder cell contain the address of the substitution block. Since the substitution block is a multiple-cell storage area, the possibility results of constructing and operating a connection as loop or conference connection. For construction of loop connections, the addresses of all outgoing connection lines over which subscribers, who are to participate in the operation, can be reached, are entered into the individual cells of the substitution block on the basis of the evaluation of the dial information. The substitution bit is no longer set in the cell of the substitution block store containing the last address for an outgoing connection line, so that a special parameter block in the store can be reached again over the cell following the aforementioned substitute block cell.

Moreover, if one assigns a substitution block to each outgoing connection line, in whose cells the addresses of the outgoing lines which are assigned to those participating in the conference connection are contained then a conference connection is possible.

The possibility of assigning a substitution block on the basis of data entered in the feeder cell offers the further advantage possibly of executing combined functions. For example, it is possible to transmit polarity changes, e.g., as parts of the dial information, and to store them intermediately at the same time, for example for purposes of zoning. For this case a substitution block is reached, on the basis of the set substitution bit (S=1) and the address in the feeder cell. In its first cell, the through-switching bit is set (D=1), and in addition the address of the outgoing line connection is contained therein. Upon reading the first cell of the substitution block through the transmission sequence control, the address of the outgoing connection line is available to it. In its second cell is located the address of a special parameter block. The inclusion of which enables the evaluation of arriving polarity changes and of polarity changes to be forwarded.

The invention has been described hereinabove in terms of a preferred mode of execution. However, it is to be understood that the aforementioned description is not limiting and modifications and changes thereto may be within the scope of the appended claims.

We claim:

1. A method of operation for receiving and transmitting data in the form of changes in polarity of the data signals in a program controlled telecommunication exchange system having incoming and outgoing lines connected thereto over a line connection unit, said exchange being in cyclic communication with at least one central storage unit over at least one transmission sequence control, said central storage unit containing all data and programs necessary for operating said exchange system, said storage unit having a feeder cell memory including a feeder cell permanently assigned to each of said lines connected with the line connection unit, each said feeder cell being addressed by an identification signal delivered by the line connection unit, the processing functions of said exchange system being under the control of programs in at least one program control unit, the method comprising the steps of:

entering instruction signals into an operation portion of each of the feeder cells for handling the next change of polarity to carry out exchange functions occurring in said exchange system, the instructions signals being entered into the feeder cells under the control of said program control unit, reading out the content of one of said feeder cells during an operating cycle by said line connection unit, said one feeder cell being addressed by identifying a one of said incoming lines assigned to said one cell on which a change of polarity is detected, evaluating the content of said one addressed feeder cell for handling the next change of polarity arriving on said identified incoming line assigned to said feeder cell, entering, responsive to a first instruction signal formed by a first bit combination within the operation portion of the said one feeder cell, a change of polarity arriving on said identified incoming line into a first storage area of said storage unit, assigning, responsive to a second instruction signal formed by a second bit combination within the operation portion of the feeder cell, a substitution block of said storage unit to said one feeder cell, the address of said substitution block being read out of an address portion within the assigned feeder cell, forwarding, responsive to a third instruction signal formed by a third bit combination within the operation portion of said one feeder cell, a change of polarity arriving on said identified incoming line to one of said outgoing lines, the address of said one outgoing line being read out of the address portion within the assigned feeder cell, accessing said first storage area by means of said program control unit during a processing phase initiated at predetermined time intervals and starting one of said programs in said control unit with each entry found during the processing phase, the contents of the cell within said first storage area containing the entered change of polarity being extinguished, entering command words into a second storage area forming a command block within said storage unit under the control of said program control unit, and accessing said second storage area and reading out of said second storage area said command words by means of said transmission sequence control during a search process initiated in predetermined time intervals, whereby the changes of polarity are transmitted through the exchange system at the proper times.

2. The method defined in claim 1 wherein said first instruction signal is formed by two bits in said feeder cell, and depending on the content of said first signal, the entry into said first storage area takes the form of one of a single note, a continuous note and a special note, and wherein the entering of the polarity changes occurs in the order of their time of arrival under the control of an address formed in said transmission sequence control from a block starting address and the state of a first binary counter, whereby the address of the incoming line over which the polarity change arrives and a datum about the time of arrival are entered into the cell of said first storage area which receives an entry.

3. The method defined in claim 2 comprising the further steps of:

entering warning marks into the processed area of said first storage area during the processing phase and requesting a premature processing cycle when the cell of said first storage area containing a warning mark is read out under the control of said transmission sequence control.

4. The method defined in claim 1 wherein said command words entered into said storage unit are one of transmission and alerting commands which are entered in a cell of the second storage unit by said program control means with an address datum, a datum indicating the time of execution of the command and an operation portion.

5. The process defined in claim 4 wherein said step of accessing said second storage area occurs in predetermined time intervals, said transmission sequence control receiving command words recognized as actual commands through a time comparison during a search process under the control of an address formed in said transmission sequence control from a block starting address and the state of a second binary counter, whereby the contents of the cell which is read out of said second storage area is simultaneously extinguished.

6. The method defined in claim 5 wherein said second storage area is subdivided into individual sections which are separated from each other by empty cells and comprising the further steps of:

entering into said individual sections command words intended for a group of connection lines with the same transmission speed, entering end marks into said empty cells under the control of said control unit after every one of said predetermined time intervals and evaluating said end marks in said transmission control as signals ending said search process.

7. The method defined in claim 6 comprising the additional steps of:

entering jump bits under the control of said control unit into said empty cells after every one of said predetermined time intervals and evaluating in said transmission sequence control said jump bits as signals indicating an alternative search process which skips at least one of said following individual sections.

8. The method defined in claim 5 wherein after execution of either one of a command or alerting command, an entry into said first storage area takes place.

9. The method defined in claim 1 wherein in said assigning step the signal for assigning said substitution block is formed by a set substitution bit in said addressed feeder cell, through the evaluation of which in said transmission sequence control the substitution block is assigned, on the basis of an address contained in said addressed feeder cell and wherein the individual cells of said substitution block contain the address of a specific outgoing line.

* * * * *